United States Patent Office 2,738,292
Patented Mar. 13, 1956

2,738,292

FABRIC STABILIZED WITH NON-CHLORINE RETENTIVE RESIN, METHOD OF PRODUCING THE SAME, AND METHOD OF PREPARING THE RESIN

John Harold Wright, Waterford, and Jack T. Inamorato, Troy, N. Y., assignors to Cluett, Peabody & Co., Inc., Troy, N. Y., a corporation of New York No Drawing. Application October 16, 1953,
Serial No. 386,675

8 Claims. (Cl. 117—139.5)

This discovery relates to a treatment for fabrics containing predominant amounts of cellulosic fibers, particularly regenerated rayon and cotton fibers, to improve the hand thereof, and inhibit progressive, dimensional shrinkage of the fabric when it is laundered. Heretofore many resins have been proposed for application to such fabrics to inhibit progressive, dimensional shrinkage upon laundering, and to improve the hand, and while many of the resins have been successful for that purpose, they have been open to the objection that fabrics treated with them are embrittled and have relatively low flex-abrasion resistance, and when laundered or bleached in baths containing chlorine, they take up and retain some of the chlorine which subsequently degrades and causes disintegration of the fabric, with resultant severe limitations on the usefulness of the fabric.

We have discovered that we can obtain the desired results of inhibiting progressive dimensional shrinkage and improve the hand of fabrics containing cellulosic fibers, without chlorine retention and the resulting damage to the fabric and without substantial decrease in the flex abrasion resistance over the untreated fabric, by preparing a new resin and applying it to the fabric. More particularly, the resin for this purpose is made of acetone, formaldehyde and acrolein which are reacted together with the use of an alkaline catalyst. Such a resin, when applied to fabrics containing cellulosic fibers, and particularly regenerated cellulose fibers, was found to impart to the fabric excellent progressive dimensional shrinkage control without appreciable or objectionable damage to the tensile strength of the fabric or damage due to chlorine retention. The fabric treated in this manner had excellent resistance to flex abrasion, and there was no yellowing of the treated fabric. The resin employed for this purpose can be prepared to have a long shelf or storage life, during which it undergoes no substantial chemical change.

In accordance with this invention, we first prepare a primary resin solution by mixing together an aqueous solution of acetone, acrolein, and formaldehyde solution in the approximate proportions, for each mol of acetone, of 1.2 to 1.7 mols of formaldehyde as a 37% solution, and 1.0 to 1.4 mols of acrolein, together with an alkaline catalyst, such as an alkali carbonate for example. The reaction of these components, when mixed together, usually is exothermic with an immediate reaction, and the reacting mixture will usually reflux for several minutes alone, after which external heat may be needed. This mixture is refluxed until the reaction is complete, after which any sediment is removed, such as by filtering. This primary resin solution is then concentrated under vacuum or reduced pressure to remove therefrom any odors and vaporizable components that might be objectionable on the fabrics. These odors are usually due to residual acrolein and formaldehyde, and the concentrated solution also is less expensive to store or ship than the unconcentrated solution. The concentration is carried on until the solids content is preferably between about 25% and 40%. Concentration greatly beyond a 40% solids is usually inadvisable because when a concentration much greater than 40% is obtained, the resin solution becomes rather viscous, making handling more difficult, and there is some danger that the resin in this concentration may become somewhat insoluble in water.

Where the primary resin solution is to be stored for a substantial period of time, the pH of the basic solution should be somewhat on the acid side, and if it is not on the acid side, the pH of the primary solution should be adjusted by the addition of an acid until the pH is either neutral or on the acid side such as between 5 and 7, for example. Such a resinous solution having a pH in that range will have a long shelf life or stability, so that it may be safely stored and will not undergo any substantial chemical change during storage.

To use this primary resin solution to treat the fabric, one first dilutes some of this primary solution with water to give the desired solids content depending upon the desired solids addition to be made to the fabric, and which will be sufficient to insure adequate stability of the fabric against progressive shrinkage during laundering. The pH of the diluted solution is adjusted to be less than about 2.5 and above about 0.75 by the addition of an acidic catalyst. The fabric is then impregnated with this diluted bath with the adjusted pH, such as by a padding operation, to give a desired solids pickup on the fabric. The amount of this pickup will depend upon the hand desired for the fabric, and to some extent upon the degree of stabilization desired. The impregnated fabric is then dried, and, after drying, is cured with heat at a temperature above about 240° F. by increasing the curing temperature the time required for the curing may be decreased, and curing has been successfully accomplished within three minutes at a temperature from 260° F. to 280° F.

In order to illustrate more specifically the manner of practicing this discovery, a number of examples were performed and some typical ones will be described as follows:

EXAMPLE 1

Formula used:
    580 g. acetone (10 mol.)
    1050 g. formalin (13 mol.)
    730 g. acrolein (13 mol.)
    6 g. potassium carbonate
    960 g. water The acetone and water were placed in a flask and the 0.6 g. potassium carbonate was dissolved in ⅓ of the formalin (350 g.) and this was added to the flask along with ⅓ of the acrolein (250 g.). The reaction was exothermic and slight external cooling was necessary. When the reaction had subsided, another ⅓ of both formalin and acrolein was added. The reaction this time was less exothermic than the first addition. When this reaction had subsided, the final ⅓ was added and after the reaction subsided, external heat was applied and the mixture refluxed for 15 minutes. The resin was then allowed to cool to room temperature.

When cool, 10 g. of 85% phosphoric acid was added, stirred, and the mixture filtered.

After filtering, the resin solution was stripped and concentrated under reduced pressure until about ⅓ of the volume had been removed. This was done mainly to remove any excess acrolein and formaldehyde whose odors would be objectionable when the resin was used on the fabric.

The resin thus obtained contained about 36% total solids and had a pH of 3.5.

139 g. of the above concentrated resin was diluted to 1 liter (5% resin solids) with water containing 10.8 g. of sodium sulfate and 47.5 g. of sodium bisulfate as catalyst. The pH of this treating solution was 1.02.

The treating solution was padded on a 100% spun viscose rayon gabardine fabric (count 100 by 50), dried for 3 minutes at 230° F. and cured for 3 minutes at 280° F.

The fabric was then washed and tested for shrinkage and tensile strength. The results are given in Table I hereinafter.

EXAMPLE II

Formula used:
  580 g. acetone (10 mol.)
  1050 g. formalin (13 mol.)
  730 g. acrolein (13 mol.)
  6 g. potassium carbonate
  1200 g. water The materials were mixed and run exactly as in Example I. The only noticeable difference is that the reaction was not as exothermic as in Example I.

After addition of 10 g. of phosphoric acid, filtering and concentrating, the total solids were 27% and the pH was 3.5.

185 g. of this resin solution was diluted to 1 liter (5% resin solids) with water containing 10.8 g. sodium sulfate and 47.5 g. sodium bisulfate as the catalyst. The pH of this treating solution was 1.05.

The treating solution was padded on a 100% viscose rayon gabardine fabric, dried for 3 minutes at 230° F. and cured for 3 minutes at 280° F.

The fabric was then tested for shrinkage and tensile strength. The results are in Table I hereinafter.

EXAMPLE III

Formula used:
  580 g. acetone (10 mol.)
  1050 g. formalin (13 mol.)
  730 g. acrolein (13 mol.)
  6 g. potassium carbonate
  1200 g. water The potassium carbonate was dissolved in the water and placed in the flask along with the acetone. The formalin (1050 g.) and acrolein (730 g.) were then added. The reaction was slightly exothermic, but easily controlled. When the reaction had subsided, external heat was applied and the reflux continued for 3 hours.

The resin solution was allowed to cool to room temperature, and 10 g. of phosphoric acid was added to it, and the mixture stirred and filtered. The resin solution was then concentrated under reduced pressure until ⅓ of the volume had been removed. The resin thus obtained had total solids of 40% and a pH of 3.5.

125 g. of the above concentrated resin was diluted to 1 liter (5% resin solids) with water containing 10.89 sodium sulfite and 47.5 g. sodium bisulfate as catalyst. The pH of this treating solution was 1.08.

The treating solution was padded on a 100% viscose rayon gabardine fabric, dried for 3 minutes at 230° F., and cured for 3 minutes at 280° F.

The fabric was then washed and tested for shrinkage, tensile strength, and abrasion resistance. The results are in Table I hereinafter.

EXAMPLE IV

Formula used:
  580 g. acetone (10 mol.)
  1160 g. formalin (14.3 mol.)
  660 g. acrolein (11.8 mol.)
  6 g. potassium carbonate
  1200 g. water This formula was mixed and run the same as for Example III. The reaction was exothermic and the mixture was refluxed gently for about 5 minutes, after which external heat was applied and refluxing continued for an additional 3 hours.

The resin was allowed to cool to room temperature, and 10 g. of phosphoric acid was then added to it and the mixture stirred and filtered.

The resin solution was divided in half, with one-half, A, being concentrated to ⅔ of its volume and the other half, B, left as it was, with no concentration. The total solids were as follows:

Part A _____ 33.5% solids.
Part B _____ 25% solids.

A 5% resin treating solution was made from each— (A) using 149 g. resin per liter and (B) using 200 g. per liter. The catalyst in both was the same—10.8 g. sodium sulfate and 47.5 g. sodium bisulfate. The pH of the treating solution (A) was 1.16 and the pH of the treating solution (B) was 1.10.

The treating solution (A) was padded on a 100% viscose rayon gabardine fabric, dried for 3 minutes at 230° F. and cured for 3 minutes at 280° F. Treating solution (B) was used the same way.

Treating solution (B) using the unconcentrated resin solution was very lacrimatory while solution (A) was not, showing the value of concentration.

The fabrics were then washed and tested. The results are in Table I hereinafter.

EXAMPLE V

Formula used:
  580 g. acetone (10 mol.)
  950 g. formalin (11.5 mol.)
  810 g. acrolein (14.5 mol.)
  6 g. potassium carbonate
  1200 g. water Procedure was the same as for Example IV. The reaction was more exothermic and some external cooling was necessary in the start. After the reaction slowed down, external heating was used to reflux the mixture for 3 hours. The pH of the mixture at this point was 5.5.

The resin was allowed to cool to room temperature, and 10 g. phosphoric acid was added to it, and the mixture stirred and filtered. The pH at this point was 3.7.

The resin solution was divided in half, after filtering, and one-half called solution "A" was concentrated to ⅔ of its volume, and the other half called solution "B" was left as it was with no concentration. The total solids were as follows:

For Part "A" _____ 41% solids.
For Part "B" _____ 31% solids.

A 5% resin treating solution was made for each— solution "A" using 122 g. resin per liter, and solution "B" using 161 g. per liter. The catalyst for both parts was the same, 10.8 g. sodium sulfate and 47.5 g. sodium bisulfate. The pH of the treating solution "A" was 1.1 and the pH of treating solution "B" was 1.13.

A treating solution "A" was padded on a 100% viscose rayon gabardine fabric, dried for 3 minutes at 230° F. and then cured for 3 minutes at 280° F. Treating solution "B" was used the same way.

Both solutions "A" and "B" were lacrimatory, due to the higher amount of acrolein used in the original resin, but solution "B" was strongly lacrimatory and solution "A" was only slightly so.

The fabrics were washed and tested. The results are in Table I hereinafter.

EXAMPLE VI

The resin was prepared from the same formula given for Example V "A." To 122 g. of the resin solution "A" made as in Example V was added 10.8 g. of sodium sulfate and 47.5 g. of sodium bisulfate. This was diluted with water to 1 liter. This is called solution (a) of Example VI. To 122 g. of the resin solution "A" made as in Example V, was added 7.6 g. of sodium sulfate and 52.8 g. of sodium bisulfate and this was diluted with water to 1 liter. This is called solution (b) of Example VI. The pH of treating solution (a) was 1.1 and of treating solution "b" was 1.0

The treating solution (a) was padded on a 100% viscose rayon gabardine fabric, dried for 3 minutes at 230° F. and cured for 3 minutes at 280° F. Treating solution (b) was used in the same way.

The fabrics were washed and tested. The results are in Table I hereinafter.

EXAMPLE VII

Formula used:
  580 g. acetone (10 mol.)
  1160 g. formalin (14.3 mol.)—pH adjusted to 6.5 using 10% potassium carbonate
  660 g. acrolein (11.8 mol.)
  6 g. potassium carbonate
  1500 g. water The potassium carbonate was dissolved in the water and placed in a flask along with the acetone (580 g.). The neutralized formalin and the acrolein were then added and a vigorous reaction took place. The mixture was allowed to stand 1½ hours without any heating. The pH of the mixture at this point was 7.6.

The resin solution was then concentrated, after filtering to about ⅔ of its volume. The total solids at this point was 30% and the pH of the solution was 6.0.

167 g. of this resin solution was diluted to 1 liter, with water containing 10.8 g. sodium sulfate and 47.5 g. sodium bisulfate as catalyst.

The treating solution was padded on a 100% viscose rayon gabardine fabric, dried for 3 minutes at 230° F. and then cured at 280° F. for 3 minutes.

The treated fabric was then washed and tested. The results are in Table I hereinafter.

EXAMPLE VIII

Formula used:
  580 g. acetone (10 mol.)
  1160 g. formalin (14.3 mol.)—pH adjusted to 6.5 using 10% potassium carbonate
  660 g. acrolein (11.8 mol.)
  1500 g. water
  6 g. potassium carbonate The carbonate was dissolved in the water and placed in a flask. The acetone (580 g.), neutralized formalin and acrolein were mixed and ½ of the total was put into the flask with the water and carbonate. The mixture heated but did not reflux. After 5 minutes ½ of the remainder was added and 5 minutes later the last of the mixture. After the last addition, heat was applied and the mixture refluxed for 5 minutes and then was allowed to stand for 1½ hours. The pH of the mixture at this point was 7.2.

The resin solution was then concentrated, after filtering, to ⅔ of its volume to give a total solids of 31% and a pH of 6.0.

162 g. of this resin solution was diluted to 1 liter, using water containing 10.8 g. sodium sulfate and 47.5 g. sodium bisulfate as catalyst.

The treating bath or solution was padded on a 100% viscose rayon gabardine fabric, dried for 3 minutes at 230° F. and then cured at 280° F. for 3 minutes.

The fabric was then washed and tested. The results are in Table I hereinafter.

EXAMPLE IX

Formula used:
  580 g. acetone (10 mol.)
  1160 g. formalin (14.3 mol.)
  660 g. acrolein (11.8 mol.)
  1500 g. water
  6 g. potassium carbonate The mixture was prepared the same as given for Example VII. The only difference was that the formaldehyde was not neutralized. The reaction was not as vigorous but otherwise was the same. After cooling, the pH of the solution was 7.5.

The resin solution was then concentrated, after filtering to ⅔ of its volume to give a total solids of 32% and a pH of 6.6.

157 g. of this resin solution was diluted to 1 liter, using water containing 10.8 g. sodium sulfate and 47.5 g. sodium bisulfate as catalyst.

The treating solution was padded on a 100% viscose rayon gabardine fabric, dried for 3 minutes at 230° F., and cured at 280° F. for 3 minutes.

The fabric was then washed and tested. The results are in Table I hereinafter.

Table I

["W" means in a warp direction, "F" means in a filling direction]

| Example | Warp Shrinkage in percent | | | Progressive Shrinkage in Percent Between 1 and 5 Washes | Tensile strength | | | | Flex Abrasion |
|---|---|---|---|---|---|---|---|---|---|
| | | | | | Dry | | Wet | | |
| | 1st Wash | 3d Wash | 5th Wash | | W | F | W | F | |
| I | 4.1 | 3.9 | 4.2 | .1 | 108 | 53 | 47 | 32 | 1,500+ |
| II | 2.6 | 2.5 | 3.5 | .9 | 112 | 56 | 50 | 26 | 1,500+ |
| III | 5.0 | 4.7 | 4.8 | −.2 | 107 | 59 | 45 | 32 | 1,500+ |
| IV A | 5.3 | 5.6 | 5.6 | .3 | 122 | 65 | 62 | 36 | 1,500+ |
| IV B | 4.2 | 4.5 | 4.3 | .1 | 108 | 57 | 59 | 34 | 1,500+ |
| V A | 4.5 | 5.5 | 5.3 | .8 | 118 | 52 | 54 | 30 | 1,500+ |
| V B | 4.4 | 4.1 | 4.8 | .4 | 115 | 52 | 50 | 22 | 1,500+ |
| VI-a | 3.4 | 3.6 | 4.3 | .9 | 125 | 63 | 62 | 34 | 1,500+ |
| VI-b | 2.5 | 3.5 | 3.3 | .8 | 123 | 63 | 67 | 34 | 1,500+ |
| VII | 3.1 | 1.9 | 3.0 | −.1 | 119 | 63 | 66 | 33 | 1,500+ |
| VIII | 1.9 | 2.7 | 2.7 | .8 | 114 | 61 | 67 | 34 | 1,500+ |
| IX | 2.5 | 2.9 | 3.7 | 1.2 | 119 | 61 | 66 | 36 | 1,500+ |
| Control untreated | 10.7 | 13.4 | 14.5 | 3.8 | 130 | 67 | 62 | 37 | 1,500+ |
| Commercial Runs of similar fabric treated with urea formaldehyde resin | 1.7 | 2.1 | 2.2 | .5 | 100 | 55 | 64 | 37 | 550–600 |

The fabrics treated as in Examples VI-a and VI-b, were subjected to the chlorine retention test, in which the chlorine tensile strength was obtained at room temperature, and also at 400° F. The results are given in Table II.

Table II

| | Tensile Strength at Room Temperature | | Tensile Strength at 400° F. | |
|---|---|---|---|---|
| | W | F | W | F |
| Example VI-a | 126 | 71 | 134 | 69 |
| Example VI-b | 116 | 66 | 127 | 70 |

Fabric treated in commercial runs with a urea formaldehyde resin had a 50 to 75% loss of tensile strength when given the same chlorine retention test.

The resin shows some utility for the shrinkproofing of cotton goods. Cotton is, of course, less swellable and more acid sensitive than is viscose rayon, and it is not to be expected that an acid cured resin treatment will be quite as effective for cotton as it is for rayon. Nevertheless, the shrinkage potential of cotton can be considerably reduced with only moderate damage, and without the yellowing or chlorine retention caused by the prior art resins.

EXAMPLE X

A sample of white cotton broadcloth (136 x 60) was saturated with a 5% solution of the resin of Example I containing 1.5% monochloracetic acid as the catalyst. It was squeezed to retain about 85% of its weight of the solution, dried at 230° F. and cured 3 min. at 280° F. There was no color change, and the treated piece was just as white as the untreated. It was then washed as for previous samples.

| No. of Washes | Percent shrinkage Warpwise | | | Loss of Strength, percent |
|---|---|---|---|---|
| | 1 | 3 | 5 | |
| Treated | 2.2 | 2.6 | 2.6 | 15 |
| Untreated | 5.5 | 5.8 | 6.1 | |

A sample of 20 in. tubular knit cotton (33 wales x 37 courses) was treated exactly as the broadcloth above and subjected to the same washing procedures. Shrinkage here is given as change in area; and bursting strength is measured rather than tensile strength.

| No. of Washes | Shrinkage Area in percent | | | Loss of Strength (Ball Burst, percent |
|---|---|---|---|---|
| | 1 | 3 | 5 | |
| Treated | 7.6 | 7.6 | 8.6 | 18 |
| Untreated | 17.5 | 18.7 | 19.2 | 0 |

While the results for cotton fabrics are not outstandingly good or startling, it must be remembered that the prior art offers no satisfactory resin treatment for cotton fabrics, and this present resin treatment shows greater promise and utility for this purpose than any resin treatment previously available.

In the foregoing tables, the item "commercial runs" represents the average of tests of a large number of samples of commercially treated viscose rayon fabric to stabilize it against laundry shrinkage with the use of a urea-formaldehyde resin. There results were typical of commercially treated viscose rayon fabrics that are accepted by the trade. In the same Table I, the initial shrinkage in the laboratory samples was higher than for commercial samples, because in commercial practice the fabric is overfed to reduce the initial shrinkage, sometimes called relaxation shrinkage. An important value is the difference between the first and third washes or between the third and subsequent washes, which indicates any progressive shrinkage. This is because most or all of the relaxation shrinkage, which occurs in the first wash, can be eliminated in commercial practice. Of course, the 10% shrinkage shown by the control fabric in the first wash is considerably more than relaxation. The tensile strength test to determine chlorine retention was performed in only a few of the examples, but all of the samples treated with this new resin definitely showed a negative chlorine retention. It will be noted, from an examination of the results given in Table I, that for the control or untreated fabric, the shrinkage after five washes, was considerable, whereas the fabric specimens treated with this resin and in accordance with this process showed excellent shrinkage control, with very little shrinkage beyond the third wash which indicates that there was no appreciable progressive shrinkage. At the same time, the tensile strength was not greatly reduced and was still within safe or acceptable limits. It will also be noted from the table, that the flex abrasion of the treated fabric was not materially affected.

The shrinkage tests were given in the warp direction, because there is usually greater shrinkage in the warp than in the filling, and if the warp shrinkage is controlled, the filling shrinkage will also be controlled. The wash test used in determining the shrinkage was the standard Government wash test for cotton, known as CCC–T–191a. The flex abrasion test to determine the abrasive resistance of cloth when flexed was by the folding bar (Stoll) method. This test is identified in Federal specifications as CCC–T–191b; method 5300 approved May 15, 1931. It was also described in the ASTM designation issued in 1951 and accepted by that Society for use pending formal adoption. In this particular test for viscose rayon, the flexing bar load was ¾ lb. and ¾ lb. pressure plate.

The tensile strength tabulations were determined by a breaking strength on a Scott tensile testing machine, using a cut strip method, ASTM designation D39—49, using cut strips 1⅝ inches wide.

Using the chlorine retention test, to determine the tensile strength after treatment with chlorine, samples of the treated fabric were first treated with chlorine, such as with sodium hypochlorite, according to the tentative chlorine retention standards of the AATCC. The heavy loss of tensile strength in the fabric treated commercially with the urea-formaldehyde resin, as shown under "Commercial Runs" as the last item of the table, is largely avoided by the use of this new resin, as shown by samples VI-a and VI-b in this table, indicates the value of this new resin for this purpose.

While the proportions of the acetone, formaldehyde and acrolein should be within the ranges specified, the preferred proportions per mol of acetone are about 1.43 mols of formaldehyde as a 37% aqueous solution, and about 1.18 mols of acrolein. These preferred results appear to give optimum results, but acceptable results are obtained within the ranges specified herein.

The useful improvement in fabric properties resulting from the use of this new resin is realized by adding this resin to the fabric in an amount of about 2% to 15% of the weight of the fabric. The hand becomes heavier and firmer as more resin is used, and the amount added will depend somewhat upon the hand desired. Where a firm hand is desired, as much as 15% resin has been used. With some easily stabilized fabrics where little or no change in hand is desired, as little as 2% has been used successfully to stabilize the fabric against shrinkage.

It will be understood that various changes in the details and materials, which have been herein described in order to explain the nature of the discovery, may be made by those skilled in the art within the principle and scope of the discovery, as expressed in the appended claims.

We claim:

1. The method of treating a textile fabric containing a predominant amount of cellulosic fibers to stabilize it against progressive, dimensional shrinkage when the fabric is laundered, which comprises first preparing a primary resin solution by mixing together, in aqueous solution, acrolein, acetone, and formaldehyde solution in the approximate proportions, for each mol of acetone, of 1.2 to 1.7 mols formaldehyde as a 37% solution, and 1.0 to 1.4 mols acrolein, together with an alkaline catalyst, refluxing the mixture until the reaction is complete, removing any sediment from the reacted mixture solution, vacuum concentrating the sediment-free solution to eliminate therefrom odors and vaporizable components, then preparing a treating bath of this concentrated, primary solution by diluting some of it with water to give a desired solids content, then adjusting the pH of the bath to less than about 2.5 and above about 0.75 through the addition of an acidic catalyst, impregnating the fabric with this dilute bath with adjusted pH, to give a desired solids pickup on the fabric, depending on the hand and degree of stabilization desired, drying the impregnated fabric, and then curing the dried fabric with heat at a temperature above about 240° F.

2. The method as set forth in claim 1, and continuing said concentration of the resin solution until the solids content is between about 25% and 40%.

3. The method as set forth in claim 1, and using an alkali carbonate as the alkaline catalyst.

4. The method as set forth in claim 1, and using a buffered acidic catalyst in adjusting the pH of the treating bath.

5. The method of preparing a non-chlorine retentive resin for use in stabilizing textile fabrics composed predominantly of cellulosic fibers, which comprises mixing together, in aqueous solution, acrolein, acetone, and formaldehyde solution in the proportions, for each mol of acetone, of 1.2 to 1.7 mols formaldehyde as a 37% solution, and 1.0 to 1.4 mols acrolein, together with an alkaline catalyst, refluxing the mixture until the reaction is complete, removing any sediment from the reacted mixture solution, and vacuum concentrating the sediment-free solution to eliminate odors and vaporizable components therefrom.

6. A textile fabric formed predominantly of cellulosic fibers, impregnated with a cured, non-chlorine retentive resin, and stabilized against progressive dimensional shrinkage when laundered, a precondensate of said resin being formed prior to its application to the fabric by mixing together, in aqueous solution, acrolein, acetone, and formaldehyde solution in the approximately proportions of 1.2 to 1.7 mols formaldehyde as a 37% solution, and 1.0 to 1.4 mols acrolein per mol of acetone, together with an alkaline catalyst, refluxing the mixture until the reaction is complete, removing any sediment, and vacuum concentrating the sediment-free solution to eliminate odors and vaporizable components therefrom.

7. A textile fabric formed predominantly of cellulosic fibers and stabilized against progressive, dimensional shrinkage when is is laundered, said fabric having its fibers impregnated with a cured, non-chlorine retentive resin corresponding before curing, to the product obtained by the reaction in the presence of alkaline catalyst of acrolein, acetone and formaldehyde in the proportions of about 1.2 to 1.7 mols formaldehyde as a 37% solution, and 1.0 to 1.4 mols acrolein, per mol of acetone.

8. The method of treating a textile fabric containing a predominant amount of cellulosic fibers to stabilize it against progressive, dimensional shrinkage when the fabric is laundered, which comprises impregnating the fabric with a water solution of a resin precondensate corresponding to the product obtained by the reaction, in the presence of an alkaline catalyst, of acrolein, acetone and formaldehyde, in the proportions of about 1.2 to 1.7 mols formaldehyde as a 37% solution, and 1.0 to 1.4 mols acrolein, per mol of acetone, and having a pH less than about 2.5 and above about 0.75, drying the impregnated fabric, and then curing the dried fabric with heat at a temperature above about 240° F.

References Cited in the file of this patent

UNITED STATES PATENTS 2,317,663     Allen et al. _____ Apr. 27, 1943